United States Patent [19]

Davis

[11] Patent Number: 4,974,905

[45] Date of Patent: Dec. 4, 1990

[54] CHAIR BED

[76] Inventor: John W. Davis, Rte. 2, Box F, Rayville, La. 71269

[21] Appl. No.: 367,133

[22] Filed: Jun. 16, 1989

Related U.S. Application Data

[63] Continuation-in-part of Ser. No. 83,067, Aug. 10, 1987, abandoned.

[51] Int. Cl.[5] .......... B60N 2/02

[52] U.S. Cl. .......... 297/377; 297/DIG. 4; 5/81 R

[58] Field of Search .......... 297/DIG. 4, 377, 417, 297/325, 360; 410/7, 3; 5/81 R; 248/503.1; 280/304.1

[56] References Cited

U.S. PATENT DOCUMENTS

| | | | |
|---|---|---|---|
| 683,032 | 9/1901 | Franklin | 297/360 |
| 1,399,744 | 12/1921 | Brophy | 297/417 |
| 1,835,840 | 12/1931 | Barclay | 410/7 X |
| 3,618,968 | 11/1971 | Greer | 297/DIG. 4 X |
| 4,065,179 | 12/1977 | Takasaki | 297/DIG. 4 X |
| 4,457,551 | 7/1984 | Anthony | 410/7 X |
| 4,560,199 | 12/1985 | Sapper | 297/323 |
| 4,574,410 | 3/1986 | Lassmann et al. | 5/81 R |
| 4,623,289 | 11/1986 | Apostolos | 410/7 |
| 4,679,259 | 7/1987 | DiMatteo et al. | 5/81 R |
| 4,688,279 | 8/1967 | Vance | 5/81 R X |
| 4,690,364 | 9/1987 | Constantin | 248/503.1 |
| 4,691,962 | 9/1987 | Holdt | 297/DIG.4 X |
| 4,729,573 | 3/1988 | Davis | 410/7 X |

*Primary Examiner*—José V. Chen
*Attorney, Agent, or Firm*—John M. Harrison

[57] ABSTRACT

A chair bed for supporting an invalid, wheelchair-bound or non-ambulatory person, which includes a seat portion and a hinged backrest attached to the seat portion for adjusting the reclining angle of the occupant, with conventional main wheels, optional rear wheels and 350 degree pivotable front wheels for rolling operation and directional control. The arm rests of the chair bed are pivotally adjustable in two sections and in a preferred embodiment, the seat portion of the chair bed is fitted with a frontal circular recess. A latch element is also provided in the chair bed frame for engaging and locking the chair bed to a receiver mechanism located in close proximity to a conventional or specially designed commode, in order to facilitate movement by the non-ambulatory chair bed occupant to and from the commode.

23 Claims, 3 Drawing Sheets

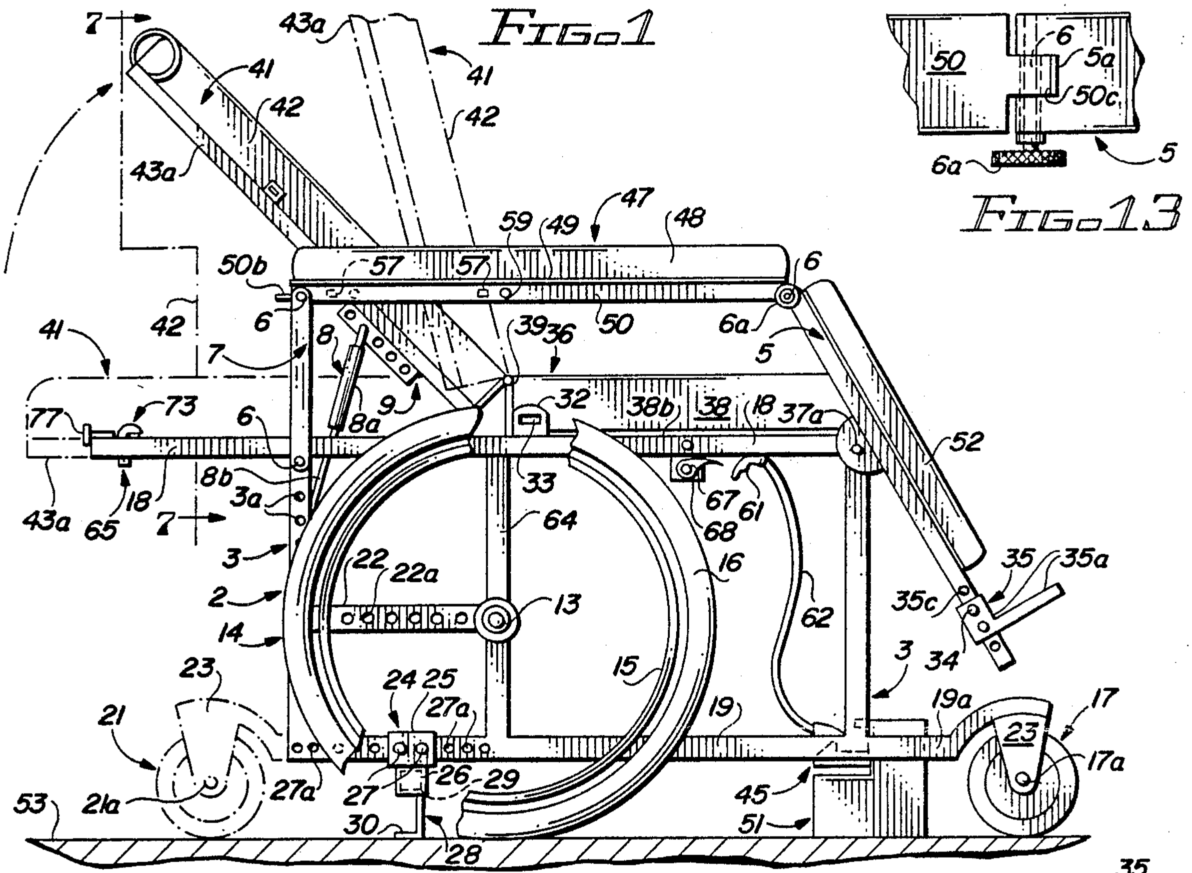
FIG. 1
FIG. 13
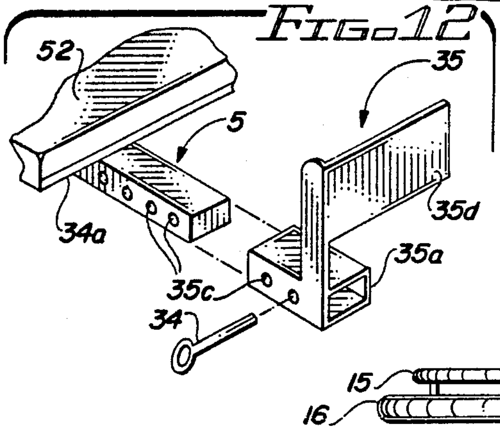
FIG. 12
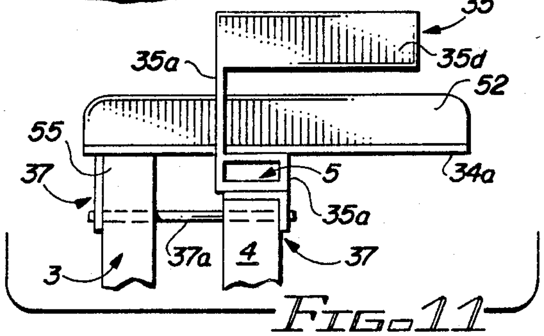
FIG. 11
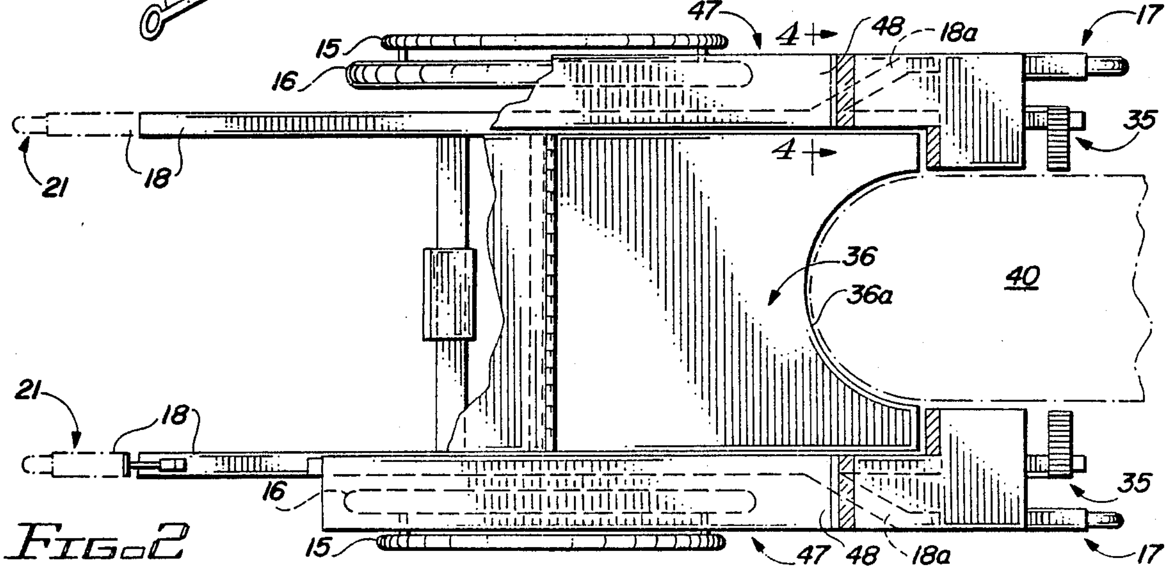
FIG. 2

CHAIR BED

CROSS-REFERENCE TO RELATED APPLICATIONS

This application is a continuation-in-part of my U.S. patent application Ser. No. 07/083,067, filed Aug. 10, 1987 now abandoned, entitled "Chair Bed" and is co-pending with my U.S. application Ser. No. 07/231,908 now U.S. Pat. No. 4,928,328, filed Aug. 15, 1988, entitled "Commode and Removable Seat". The application also relates to my U.S. Pat. No. 4,729,573, dated Mar. 8, 1988, entitled "Wheelchair Latching Device".

BACKGROUND OF THE INVENTION

1. Field of the Invention

This invention relates to a chair bed which is designed for latching in close proximity to a commode by means of a latching device, in order to facilitate movement between the commode and the chair bed by a non-ambulatory person. The chair bed of this invention is useful and convenient for invalids who are unable to ambulate from a wheelchair to a commode and back to the wheelchair without assistance. The chair bed is particularly designed to operate in cooperation with the "Commode and Removable Seat" and "Wheelchair Latching Device" disclosed in my co-pending U.S. patent applications and my U.S. Pat. No. 4,729,573, identified above.

One of the problems realized in the case of non-ambulatory invalids who are confined to wheelchairs is that of conveniently exiting the wheelchair, maneuvering onto a commode and subsequently relocating in the wheelchair. The problem is intensified because the wheelchair must be maneuvered directly toward the commode and then the occupant must not only stand, but also position his or her body in a 180° relationship with respect to the wheelchair, in order to sit on the commode. This maneuver is frequently difficult or impossible in the case of invalids who are not ambulatory and these persons must generally be helped from the wheelchair onto the commode and back to the wheelchair. Although conventional wheelchairs are provided with wheel locks to prevent the wheelchair from rolling, the wheelchair may still slide with respect to the commode, thereby risking injury to the occupant. This hazard is particularly dangerous under circumstances where the bathroom floor is constructed of tile or is waxed. Furthermore, conventional wheelchairs are normally not fitted with an adjustable backrest and do not therefore facilitate lowering the patient to a fully reclined position. Such a facility is advantageous, particularly when used in cooperation with my specially designed "Commode and Removable Seat" and my "Wheelchair Latching Mechanism", for undertaking diagnostic work and examination, which require use of the commode and dictate that the patient be oriented in a reclined or semi-reclined position.

Various devices are known in the art for assisting non-ambulatory persons in undertaking various ambulatory operations such as maneuvering from a wheelchair onto a chair or bed or onto a commode and back into the wheelchair. A "Convertible Nursery Chair" is disclosed in U.S. Pat. No. 1,492,798, dated May 6, 1924, to C. Houston. The convertible nursery chair is hygienic and comfortable to a child and is adapted and designed for training a child to use the bathroom at an early age. In a preferred embodiment the nursery chair includes a supporting frame, a seat frame and a back mounted on the supporting frame, each of which frames are adapted for adjustment at various angles with respect to each other. An apertured seat and a pivotally supported, pommel-like frame project above the seat frame and the nursery chair includes a projecting arm and a post mounted on the front of the seat frame with the arm movably supported by the post. U.S. Pat. No. 2,299,240, dated Oct. 20, 1942, to J. B. Michon, discloses a "Bed Commode Chair". The bed commode chair detailed in this patent includes a hinged frame with a commode seat attached thereto and a receptacle therein for use with a patient on a bed, in order to provide for normal body functions without having the patient vacate the bed. U.S. Pat. No. 4,199,829, dated Apr. 29, 1980, to Watanabe, et al, discloses a nursing system which is characterized by a wheelchair device having a number of forks supported at one end by side plates, to constitute a backrest, seat and footrest. A transferring means having runway rails secured in preselected locations are also provided, along with a trolley adapted to travel along the rails. The trolley is designed to hold the patient in a carrier means in such a manner as to permit upward and downward movement of the carrier means. Nursing aids such as a toilet and bathtub are disposed within reach of the patient carrying means and a bed having multiple lands and furrows or alternately raised and sunken portions formed on the surface, correspond to the forks of the patient carrying means. Other patents which are pertinent to the invention are U.S. Pat. No. 4,574,410, to Lassmann, et al; U.S. Pat. No. 3,618,968, to Greer; U.S. Pat. No. 4,560,199, to Sapper; U.S. Pat. No. 1,399,744, to Brophy; U.S. Pat. No. 683,032, to Franklin; U.S. Pat. No. 4,065,179, to Takasaki; U.S. Pat. No. 4,457,551, to Anthony; U.S. Pat. No. 4,623,289, to Apostolos; U.S. Pat. No. 1,835,840, to Barclay; and U.S. Pat. No. 4,690,364, to Constantin.

It is an object of this invention to provide a new and improved chair bed which is designed to facilitate location of a non-ambulatory person in a fully sitting, fully reclined and intermediate reclining positions therein.

Another object of this invention is to provide a chair bed wheelchair which is characterized by an adjustable backrest and two-piece arm rests and is fitted with conventional large or main wheels and 360 degree rotatable front wheels or optional rear wheels, for operation.

Yet another object of the invention is to provide an improved chair bed which is provided with an adjustable backrest, pivotally adjustable, two-section arm rests and a latch mechanism for engaging a wheelchair latching device and locating the chair bed in close proximity to a commode, in order to facilitate movement of a non-ambulatory person to and from the chair bed and the commode.

Still another object of this invention is to provide a new and improved chair bed for non-ambulatory, wheelchair-bound patients, which chair bed is characterized by a padded seat portion, a padded backrest component which is hinged to the seat portion and is adjustable to facilitate fully reclining or sitting positions for the patient, pivotally adjustable, double-pivoting armrests and a frontal recess provided in the seat portion, in order to locate the chair bed in close proximity to a commode, such that the patient is able to move to and from the chair bed and the commode with relative ease.

Yet another object of this invention is to provide a chair bed for non-ambulatory persons, which is characterized by front and rear, 360 degree rotatable and pivotable guide wheels, an adjustable, padded backrest, pivotally adjustable arm rests and connecting foot supports and a latch mechanism for engaging and removably locking to a receiver mechanism mounted in close proximity to a commode, in order to releasably immobilize the chair bed close to the commode.

SUMMARY OF THE INVENTION

These and other objects of the invention are provided in a new and improved chair bed for non-ambulatory persons, which chair bed includes a padded seat portion having a frontal circular recess therein in order to accommodate the front portion of a commode; a padded, adjustable backrest hinged to the seat portion, which backrest is adjustable to fully reclining and upright seating positions by operation of air cylinders; padded and pivotally adjustable, two-piece arm rests and connecting foot supports; and a latch mechanism for engaging a receiver mechanism mounted on the floor in near the commode for removably and releasably securing the chair bed in close proximity to the commode, such that the non-ambulatory person is able to move to and from the chair bed and commode at will.

BRIEF DESCRIPTION OF THE DRAWINGS

The invention will be better understood by reference to the accompanying drawings, wherein:

FIG. 1 is a side elevation of a preferred embodiment of the chair bed of this invention;

FIG. 2 is a top of the chair bed illustrated in FIG. 1;

FIG. 11 is an end view, partially in section, of the foot support illustrated in FIG. 10;

FIG. 12 is a perspective view of the foot support illustrated in FIG. 11;

FIG. 13 is a sectional view taken along line 13—13 of a preferred pivot joint located in each of the arm rests illustrated in FIG. 3.

DESCRIPTION OF THE PREFERRED EMBODIMENTS

Figure 4:
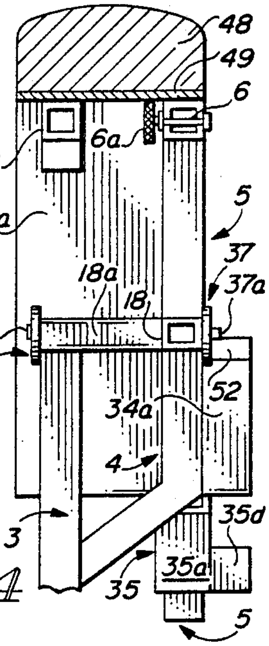
FIG. 4 is a rear view, partially in section, taken along line 4—4 in FIG. 2, of a preferred mechanism for pivoting the arm rests with respect to the seat portion and frame of the chair bed.
Figure 9:
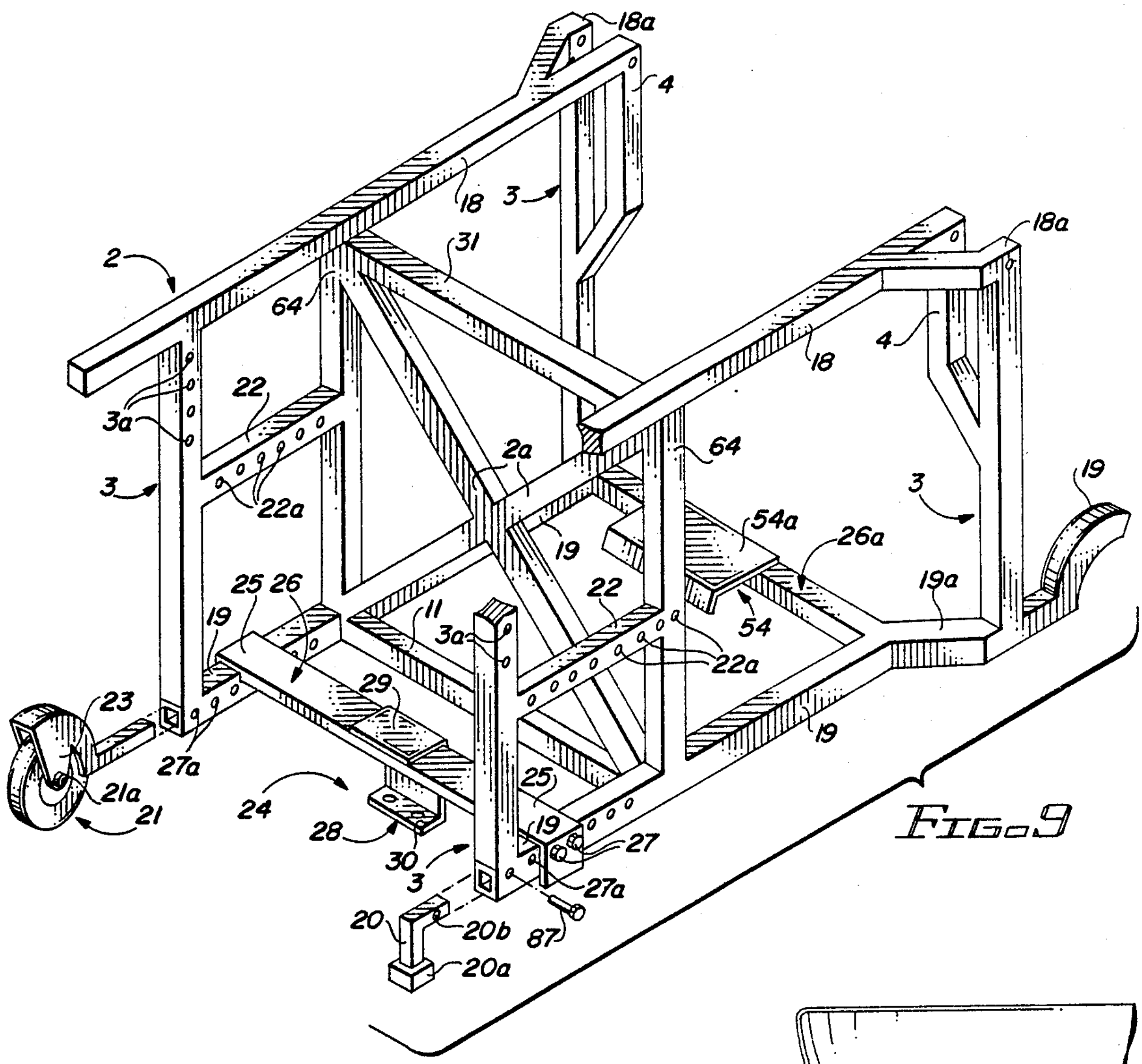
FIG. 9 is a perspective view of a preferred chair bed frame.
Figure 10:
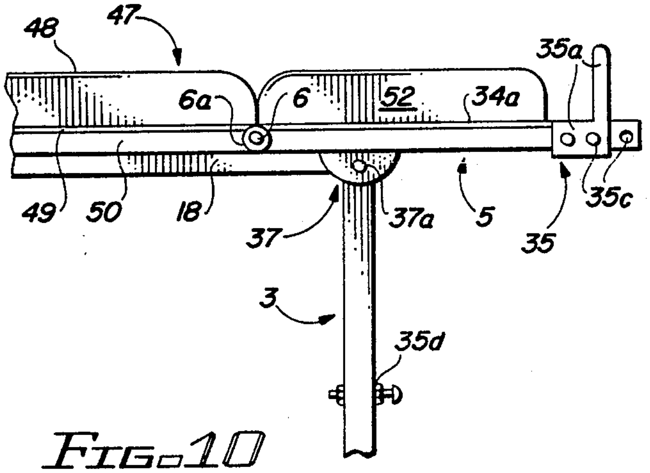
FIG. 10 is a side elevation, partially in section, of a preferred foot support for the chair bed.

Referring initially to FIGS. 1, 2, 4, 9 and 13 of the drawings in a most preferred embodiment, the chair bed of this invention is generally illustrated by reference numeral 1. The chair bed 1 is characterized by a frame 2, which includes four parallel front and rear vertical supports 3, with vertical wheel-supports 64 and interior cross-braces **2*a* mounted therebetween. The rear vertical supports 3 are fitted with spaced support adjusting holes 3*a*, for purposes which will be hereinafter described. A top cross-brace 31 and bottom cross-brace 11 serve to complete the frame 2. A pair of top horizontal supports 18 are mounted on the top ends of the vertical supports 3, wherein vertical support braces 4 and top support offsets 18*a* serve to connect the top horizontal supports 18 to the vertical supports 3, respectively. One end of a pair of cooperating rear pivoting members 7 are pivotally mounted to each of the rear set of vertical supports 3 and at the opposite ends to the arm rest brackets 50, provided in the arm rests 47, respectively, as illustrated in FIGS. 1 and 4. A pair of foot support bars 5 are pivoted near the center thereof to the top horizontal supports 18 by means of spaced foot support brackets 37 and cooperating bracket pins 37*a*. Furthermore, the top ends of the foot support bars 5 are pivoted to the arm rest brackets 50 by means of pivot pins 6 and cooperating lock knobs 6*a*. The pivot pins 6 project through the foot support bars 5 and a bracket neck 50*c*, which extends into a corresponding bar slot 5*a*, located in each of the foot support bars 5, as illustrated in FIG. 13. Accordingly, each of the arm rests 47 are pivotally adjustable at two points to an upright position and a folded position with respect to the top horizontal supports 18, as hereinafter further described. A central axle 13 extends through one of several bar adjusting holes 22*a* located in the axle mount bar 22 and the wheel support 64 and the axle 13 rotatably carries a pair of main wheels 14 for locomotion of the chair bed 1. Each main wheel 14 is further characterized by a tire 16 and a propulsion bar 15, in conventional wheelchair arrangement. Each of the vertical supports 3 is welded to parallel pairs of spaced bottom horizontal supports 19 at the bottom support offsets 19*a*, as well as to the top horizontal supports 18, at the top support offsets 18*a*. A pair of front wheels 17 are secured by means of a front wheel pins 17*a* to corresponding wheel brackets 23, attached to the bottom support offsets 19*a* of the bottom horizontal supports 19. A rear engaging bar 26 spans the parallel bottom horizontal supports 19 and is adjustable rearwardly of the wheel supports 64 by means of the mount brackets 25 and the mount bracket bolts 27 and mount bracket holes 27*a*, provided in the bottom horizontal supports 19, as illustrated in FIG. 9. In a preferred embodiment, the front wheels 17 are rotatably mounted on the wheel brackets 23 by means of vertical bracket pins (not illustrated) in conventional fashion, such that the front wheels 17 are easily rotated through 360°, in order to facilitate optimum maneuverability of the chair bed 1 in conventional wheelchair fashion. A front engaging bar 26*a* extends between the bottom horizontal supports 19 at the bottom support offsets 19*a* and a latch mechanism plate 54*a* is welded or otherwise secured to the front engaging bar 26*a*. The opposite ends of the parallel bottom horizontal supports 19 may be each adapted to receive a safety bar 20, tipped with a bar pad 20*a*, in order to prevent the chair bed 1 from tipping rearwardly and spilling the occupant. An adjusting pin 87 is inserted in a selected one of the mount bracket holes 27***a* and the safety bar opening 20*b* for mounting each safety bar 20 on the bottom horizontal supports 19, as further illustrated in FIG. 9. Alternatively, a pair of rear wheels 21 can be rotatably and pivotally mounted to the corresponding wheel brackets 23, located on the projecting ends of the bottom horizontal supports 19, by means of additional vertical bracket pins (not illustrated) and rear wheel pins 21*a*, as illustrated in FIG. 1. The wheel brackets 23 are adjustably secured to the bottom horizontal supports 19 by means of adjusting pins 87, extended through the mount bracket holes 27*a* and the wheel bracket openings 23*a*, respectively. It is understood that under circumstances where the rear wheels 21 and front wheels 17 are used, the main wheels 14 can be removed from the frame 2.

Referring again to FIGS. 1, 2 and 9, a transport flange 24 is secured to the floor of a vehicle (not illustrated) and is adapted to receive the engaging bar 26, which is adjustable front-to-rear by means of the mount brackets 25, welded to the ends of the rear engaging bar 26 and mounted on the parallel bottom horizontal supports 19 by means of the mount bracket bolts 27. The engaging bar 26 is designed to receive the top flange 29 of a channel 28 having a bottom flange 30 in the transport flange 24, which bottom flange 30 is secured to the floor 53 of the vehicle (not illustrated), for securing the chair bed 1 to the vehicle during transportation. A seat belt bracket 32 is secured to each of the top horizontal supports 18 in facing relationship by means of seat belt bracket bolts (not illustrated) and a belt slot 33 is provided in each of the seat belt brackets 32, to accommodate a seat belt (not illustrated), and secure an occupant in seated position on the seat pad 38 of the seat 36, as illustrated in FIG. 1. This mechanical arrangement is particularly important when the chair bed 1 is locked into the channel 28 of the transport flange 24, for transportation purposes.

Figure 3:
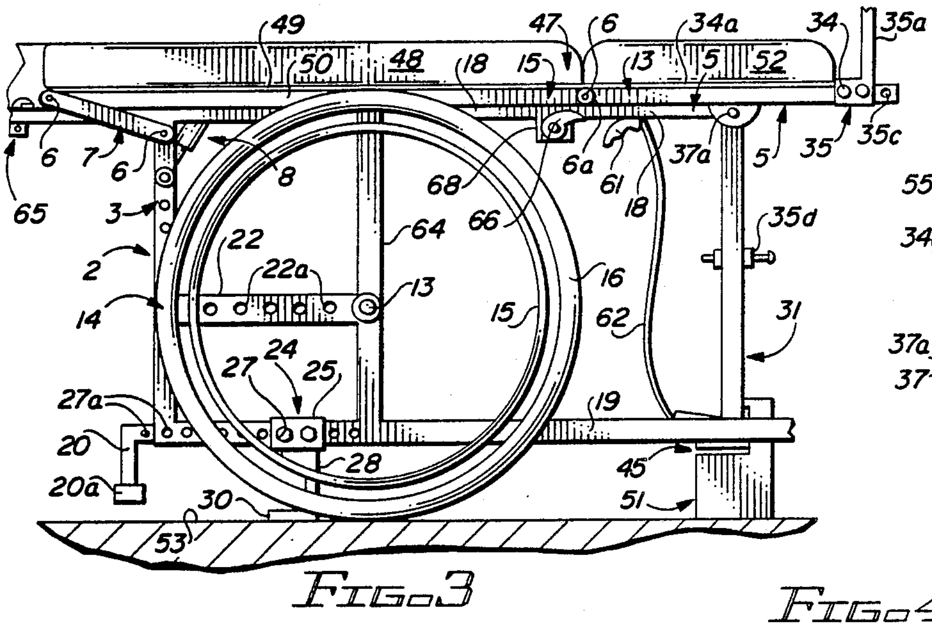
FIG. 3 is a side view, partially in section, of the chair bed illustrated in FIG. 1, with the arm rests pivoted downwardly with respect to the chair bed frame.

In a most preferred embodiment of the invention and referring again to FIGS. 1–4 and 11–13, a pair of foot supports 35 are adjustably secured to the bottom end of the foot support bars 5, which are welded or otherwise secured to the foot rest pad plates 34*a* and are pivotally attached to the front vertical supports 3, respectively, at the foot support brackets 37 by means of the bracket pins 37*a*, in order to accommodate the feet of the occupant. The foot rest bars 35*a* of the foot supports 35 are slidably secured to the foot support bars 5, respectively, by means of a foot rest pin 34, which is inserted in selected ones of the adjusting holes 35*c*, provided in each foot rest bar 35*a* and corresponding foot support 5, respectively, as illustrated in FIG. 12. A foot support stop 35*d* extends from each of the foot rest bars 35*a* and serves to support the feet of an occupant. As illustrated in FIGS. 3, 4 and 11, a shim 55 is welded or otherwise secured to each of the foot rest pad plates 34*a*, for engaging the top horizontal supports 18 when the foot support bars 5 are lowered in alignment with the arm rest brackets 50, as illustrated in FIG. 3.

In another most preferred embodiment of the invention the seat pad 38 and underlying seat base 38*b* of the seat 36 are fitted with a curved seat recess 36*a*, as illustrated in FIG. 2, in order to accommodate the frontal area of a rounded commode seat (not illustrated) of a commode 40, as illustrated in phantom in FIG. 2. In yet another preferred embodiment of the invention the seat 36 is hingedly attached to a backrest 41 by means of a seat piano hinge 39. The backrest 41 is characterized by a backrest pad 42, mounted on a backrest base 43, which is attached to a backrest frame 43*a*. The seat piano hinge 39 is welded or otherwise attached to the backrest frame 43*a* and to the top cross brace 31, which extends between the top horizontal supports 18.

Figure 7:
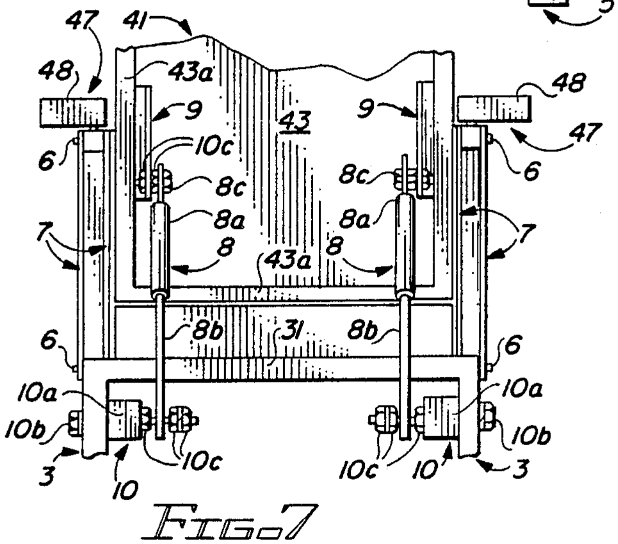
FIG. 7 is a rear elevation, partially in section, of the chair bed with the backrest in upright configuration.

Referring to FIGS. 1 and 7 of the drawings, a pair of air cylinders 8, each having a housing 8*a* and a cooperating piston 8*b*, are mounted on the base cylinder mounts 9 and frame cylinder mounts 10, respectively, for controlling the angle of repose of the backrest 41 with respect to the seat 36. The base cylinder mounts 9 are welded or otherwise secured to the back rest frame 43*a* and the housing 8*a* is mounted to a selected one of the adjusting holes 44 in the cylinder mounts 9 by means of the housing bolts 8*c* and nuts 10*c*, while the frame cylinder mounts 10 include cooperating spacers 10*a*, mount bolts 10*b* and nuts 10*c*, respectively, for securing the pistons 8*b* to the vertical supports 3, respectively. As illustrated in phantom in FIG. 1, the backrest 41 can be pivoted on the seat piano hinge 39 to a fully upright or a prone configuration, as well as selected angular configurations between these two extreme positions. The air cylinders 8 may be rendered adjustable to compensate for an occupant of selected size and weight, in conventional fashion, by using appropriate air fittings (not illustrated) according to the knowledge of those skilled in the art, for introduction and removal of air.

Referring now to FIGS. 1, 3, 4 and 13 of the drawings, in another preferred embodiment of the invention the arm rests 47 are pivotally attached to the pair of foot support bars 5 at the pivot pin 6 and lock knob 6*a* and are provided with arm rest pads 48, each mounted on an arm rest base 49, braced by an arm rest bracket 50. Furthermore, the foot support bars 5 are fitted with similar foot support pads 52. As heretofore noted, the arm rests 47 and foot support bars 5 are pivotally adjustable in concert with respect to the top horizontal supports 18 of the chair bed 1, by manipulation of the rear pivoting members 7.

Figure 6:
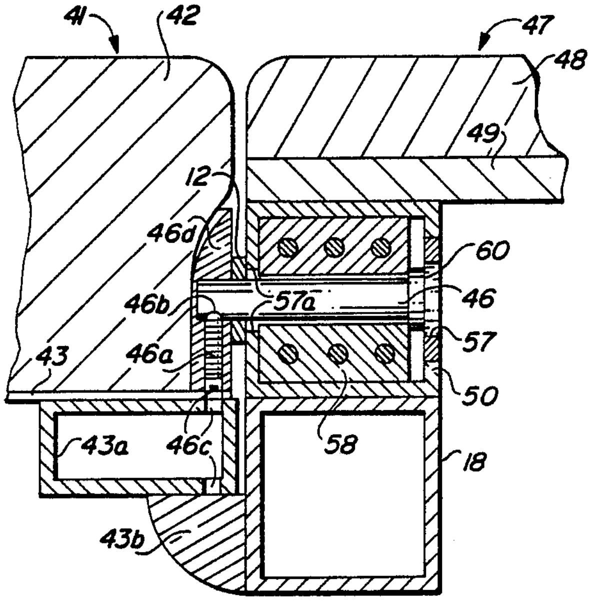
FIG. 6 is a sectional view taken along line 6—6 of the sliding support mechanism illustrated in FIG. 5.
Figure 5:
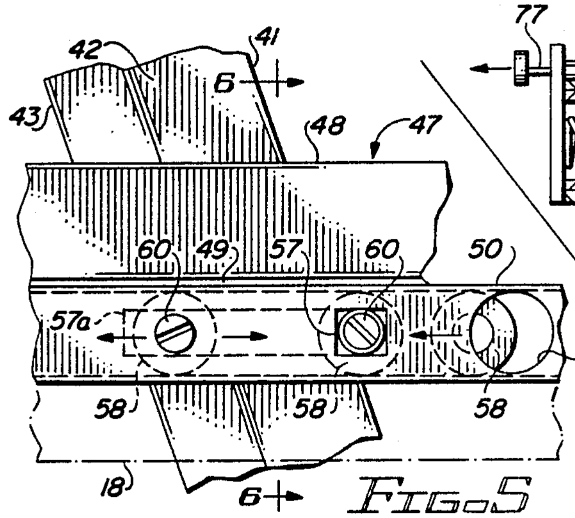
FIG. 5 is a side view, partially in section, of a preferred sliding support mechanism for supporting and stabilizing the backrest of the chair bed along its travel from a fully reclined position to a partially reclined configuration.

As illustrated in FIGS. 3, 5 and 6 of the drawings, the backrest 41 is relatively movable with respect to the arm rests 47 by means of a pair of pin rollers 58, each of which rides inside one of the arm rest brackets 50, respectively. The pin rollers 58 are each initially inserted into the arm rest brackets 50 through a roller access opening 59 and are then rotatably mounted on an arm rest pin 46, which is inserted through a front tubing slot 57 and a rear tubing slot 57*a*, provided in opposite sides of the arm rest brackets 50 and spaced from the roller access opening 59. A roller bolt 60, which is also inserted through the front tubing slot 57, is threaded into one end of the arm rest pin 46 to secure each roller 58 on a corresponding arm rest pin 46. The head of the roller bolt 60 is recessed inside the arm rest brackets 50 to facilitate travel of each arm rest pin 46 and the corresponding roller 58 throughout the length of the rear tubing slots 57*a*, which slidably receive the cooperating arm rest pins 46 and limit the travel of each respective pin roller 58 short of the roller access opening 59. An allen screw 46*a* is threaded into each arm rest pin mount plate 46*d*, which is welded to the back rest base 43, and projects through an allen screw access 46*c*, located in the backrest base 43 and the backrest frame 43*a*. The allen screw 46*a* engages a recess 46*b*, drilled in the arm rest pin 46, to firmly seat the arm rest pins 46 in the arm rest pin mount plates 46*d*, respectively. A washer 12 is mounted on each arm rest pin 46 between the arm rest brackets 50 and the arm rest pin mount plates 46d, as a spacer. When the chair bed 1 is in the reclining configuration illustrated in FIG. 3, it can be used as a bed for sleeping or resting, or for diagnostic purposes and a patient is easily transported in the chair bed 1 while lying in the prone position, as well as sitting in the upright position.

Figure 14:
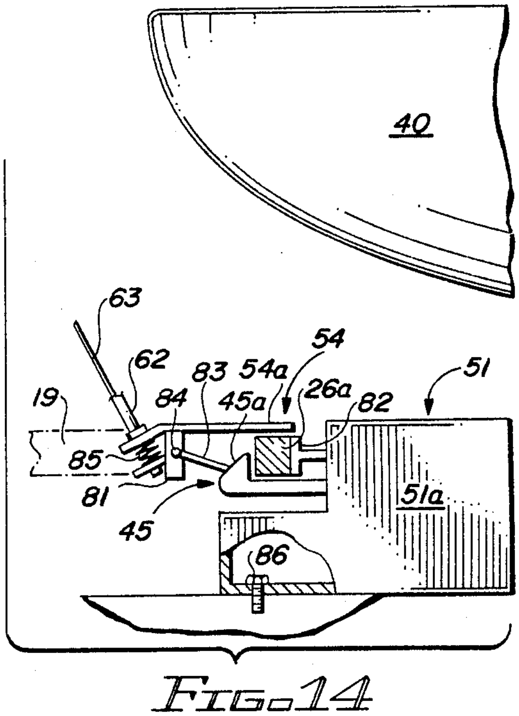
FIG. 14 is a side elevation, partially in section, of a preferred latch and release mechanism and a cooperating receiver mechanism for locking the chair bed into close proximity to a commode.

Referring now to FIGS. 1, 2, 9 and 14 of the drawings, the chair bed 1 is fitted with a latch mechanism 54, such as the latch mechanism disclosed in my U.S. Pat. No. 4,729,573, entitled "Wheelchair Latching Device", which discloses a receiver mechanism mounted in close proximity to a commode such as the commode disclosed in my co-pending U.S. patent application Ser. No. 07/231,908, entitled "Commode and Removable Seat". This latch mechanism 54 is adapted to engage a corresponding receiver mechanism 51, in order to secure the chair bed 1 in close proximity to the commode 40, as illustrated in FIG. 14. The receiver mechanism 51 is bolted to the floor or other support by means of a mount bolt 86 and includes a spring-loaded tension receiver 82 and a pivoting latch tongue 45, fitted with an upward-standing latch tongue lip 45a. The cooperating latch mechanism 54 is further provided with a pivot plate 83, which pivots on a pivot pin 84, mounted on a pin plate 81, that is secured to the latch mechanism plate 54a. A pull cable 63 projects through the latch release cable 62 and extends through the downwardly-extending end of the latch mechanism plate 54a and the pivot spring 85, to anchor in one end of the pivot plate 83. Accordingly, when the chair bed 1 approaches the commode 40, the front engaging bar 26a initially engages the latch tongue lip 45a, forcing the latch tongue 45 downwardly, and subsequently forces the tension receiver 82 rearwardly against the bias of a spring (not illustrated), into the housing 51a of the receiver mechanism 51. The latch tongue 45 then moves upwardly responsive to the bias of a second internal spring (not illustrated) to engage the front engaging bar 26a by operation of the latch tongue lip 45a. The chair bed 1 is thus secured in close proximity to the commode 40, with the curved front of the commode 40 aligned with the seat recess 36a of the seat 36, as illustrated in FIG. 2. The chair bed 1 is released from this configuration by lifting the latch release lever 61, illustrated in FIG. 1, upwardly, which tensions the pull cable 63, forces the extending end of the pivot plate 83 downwardly against the latch tongue lip 45a and causes the latch tongue 45 to pivot downwardly, releasing the front engaging bar 26a. This facility allows the patient to first lock the chair bed 1 in close proximity to the commode 40 and easily move from the chair bed 1 to the commode 40 and back from the commode 40 to the chair bed 1 as desired, without help from a third party, and subsequently release the chair bed from the receiver mechanism 51. Furthermore, the reclining capability of the chair bed 1 as illustrated in FIG. 3 of the drawings, coupled with capability of latching the chair bed 1 in close proximity to the commode 40, allows examination and diagnostic work, such as lower gastrointestinal procedures and other procedures to be performed under circumstances where use of the commode 40 is necessary or desirable.

Figure 8:
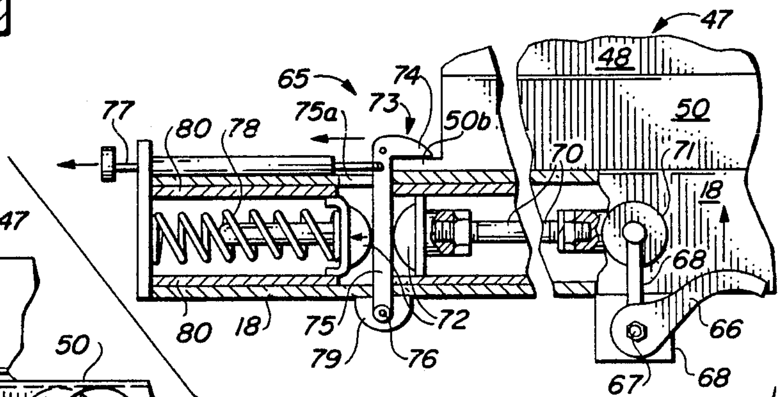
FIG. 8 is a longitudinal sectional view of a preferred arm rest latch and release mechanism.

Referring now to FIGS. 1, 3 and 8 of the drawings, with particular emphasis on FIG. 8, an arm rest release is generally illustrated by reference numeral 65. The arm rest release 65 is designed to selectively secure and release each of the arm rests 47 and the foot support bars 5 from the folded configuration illustrated in FIG. 3, in order to facilitate pivoting the arm rests 47 and the foot support bars 5 into the upright position illustrated in FIG. 1. Each arm rest release 65 is characterized by a release lever 66, which is pivotally mounted to a release lever bracket 68 by means of a lever pin 67, as illustrated in FIG. 8. An actuator rod 69 extends from the pivoted end of the release lever 66 and is attached to a push rod connector 71, which pivotally carries a push rod 70. The actuator rod 69 extends through a slot (not illustrated) provided in the wall of the top horizontal supports 18, respectively, and carries the push rod 70, such that manipulation of each release lever 66 in an upward motion as indicated by the arrow, forces the cooperating push rod 70 rearwardly to perform the arm rest release function, as hereinafter further described. An engaging member 72 is attached to the extending end of the push rod 70 and rests against the retainer leg 75 of an arm rest retainer 73, which extends transversely and pivotally through retainer slots 75a in each of the top horizontal supports 18. One end of each of the retainer legs 75 is pivotally attached to a retainer mount bracket 79, fixed to the top horizontal supports 18, respectively, by means of a retainer pin 76, while the opposite end of the retainer leg 75 is shaped to define a retainer jaw 74, that releasably engages a bracket lip 50b, extending outwardly from the ends of the arm rest brackets 50, respectively. A second engaging member 72 engages the retainer leg 75 opposite the first engaging member 72 and is biased against the retainer leg 75 by means of a spring 78, which is located in a spring housing 80, positioned inside each top horizontal support 18. A manual pull 77 is also mounted on each of the top horizontal supports 18 and engages each retainer leg 75, respectively, for manually removing the companion retainer jaw 74 from the bracket lip 50b to release the arm rest 47, as hereinafter described. Referring again to FIGS. 1, 3 and 8 of the drawings, when it is desired to move the arm rest 47 from the folded configuration illustrated in FIGS. 3 and 8 to the upright configuration shown in FIG. 1, each release lever 66 is first manipulated upwardly in the direction of the arrow to rotate the companion actuator rod 69 and the push rod connector 71 rearwardly, thus thrusting the push rod 70 rearwardly and the engaging member 72 against the retainer leg 75. This action also forces the opposite engaging member 72 rearwardly against the bias in the spring 78 to disengage the retainer jaw 74 from the bracket lip 50b of each arm rest bracket 50 and facilitate upward pivoting of the backrest 41 on the seat piano hinge 39, responsive to operation of the air cylinders 8, and upward pivoting of the arm rests 47 and the front pivoting members 5 by operation of the rear pivoting members 7, to the position illustrated in FIG. 1. Similarly, under circumstances where the occupant of the chair bed 1 is unable to manipulate the release lever 66, the arm rest 47 can be released for pivoting into the upright configuration illustrated in FIG. 1 by extending the manual pulls 77 rearwardly in the direction of the arrow, to manually disengage the retainer jaws 74 from the respective bracket lips 50d.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. In a chair bed which functions as a wheelchair and a bed and is adapted for stabilizing in a receiver mechanism in close proximity to a commode, the improvement comprising a frame; a pair of main wheels journalled for rotation in said frame; a pair of front wheels rotatably and pivotally carried by said frame in spaced relationship with respect to said main wheels; a seat provided in said frame for supporting an occupant and a curved recess provided in said seat for receiving a cured front portion of the commode; a backrest hingedly attached to said seat for supporting the back of the occupant; backrest adjusting means carried by said frame and said backrest for adjusting the angle of repose of said backrest with respect to said seats; latch means carried by said frame, said latch means adapted to removably engage the receiver mechanism and secure said chair bed in close proximity to the commode, with the curved front portion of the commode selectively inserted in said curved recess in said seat; a pair of arm rests pivotally carried by said frame in spaced relationship, said arm rests spanning said seat and adapted for selectively pivoting into a first position spaced from said frame when said backrest is elevated with respect to said seat and into a second position resting on said frame when said backrest is lowered into the plane of said seat; a pair of foot support bars pivotally carried by said frame and pivotally connected to one end of said arm rests, respectively; and a pair of rear pivoting members pivotally carried by said frame and the opposite ends of said arm rests, respectively, said rear pivoting members adapted for selectively raising and lowering said arm rests and said foot support bars with respect to said frame.

2. The chair bed of claim 1 wherein said chair bed is adapted for stabilizing in a vehicle and further comprising an engaging bar carried by said frame and a cooperating transport flange secured in the vehicle, said engaging bar adapted for removably engaging said transport flange and securing said chair bed to the vehicle during transportation of the chair bed.

3. The chair bed of claim 1 wherein said backrest adjusting means further comprises at least one air cylinder disposed between said frame and said backrest, for supporting said backrest at a selected angle with respect to said seat.

4. The chair bed of claim 3 wherein said chair bed is adapted for stabilizing in a vehicle and further comprising an engaging bar carried by said frame and a cooperating transport flange secured in the vehicle, said engaging bar adapted for removably engaging said transport flange and removably securing said chair bed to the vehicle during transportation of the chair bed.

5. The chair bed of claim 4 wherein said backrest adjusting means further comprises a pair of air cylinders, each having a piston end pivotally carried by said frame and a housing end pivotally carried by said backrest, for supporting said backrest at a selected angle with respect to said seat.

6. The chair bed of claim 1 further comprising backrest stabilizing means carried by said backrest and rotatably engaging said arm rests, for smooth adjustment of said backrest with respect to said arm rests.

7. The chair bed of claim 6 wherein said backrest stabilizing means further comprises two lengths of square tubing carried by said arm rests in spaced relationship, respectfully; a longitudinal slot provided in each of said lengths of square tubing and a pin roller disposed in rotatable relationship in each of said lengths of square tubing; an arm rest pin projecting through said longitudinal slot in each of said lengths of square tubing, with one end of said arm rest pin fixedly carried by said backrest and the opposite end of said arm rest pin rotatably attached to said pin roller, whereby said pin roller is caused to traverse said square tubing and said arm rest pin traverses said longitudinal slot in each of said lengths of square tubing, respectfully, responsive to adjustment of said backrest with respect to said arm rests.

8. The chair bed of claim 7 wherein said chair bed is adapted for stabilizing in a vehicle and further comprising an engaging bar carried by said frame and a cooperating transport flange secured in the vehicle, said engaging bar adapted for removably engaging said transport flange and removably securing said chair bed to the vehicle during transportation of the chair bed.

9. The chair bed of claim 8 wherein said backrest adjusting means further comprises a pair of air cylinders disposed between said frame and said backrest, for supporting said backrest at a selected angle with respect to said seat.

10. The chair bed of claim 9 wherein said chair bed is adapted for stabilizing in a vehicle and further comprising:

(a) an engaging bar carried by said frame and a cooperating transport flange secured to the vehicle, said engaging bar adapted for removably engaging said transport flange and removably securing said chair bed to the vehicle during transportation of the chair bed;

(b) backrest stabilizing means carried by said backrest and rotatably engaging said arm rest, for smooth adjustment of said backrest with respect to said arm rests.

11. The chair bed of claim 10 wherein said backrest stabilizing means further comprises two lengths of square tubing carried by said arm rests in spaced relationship, respectively; a longitudinal slot provided in each of said lengths of square tubing and a pin roller disposed in rotatable relationship each of said lengths of square tubing; an arm rest pin projecting through said longitudinal slot in each of said lengths of square tubing, with one end of said arm rest pin fixedly carried by said backrest, and the opposite end of said arm rest pin rotatably attached to said pin roller, whereby said pin roller is caused to traverse said square tubing and said arm rest pin traverses said longitudinal slot in each of said lengths of square tubing, respectively, responsive to adjustment of said backrest with respect to said arm rests.

12. The chair bed of claim 1 further comprising a pair of rear wheels rotatably and pivotally carried by said frame in spaced relationship with respect to said main wheels and said front wheels for enhancing the directional control of said chair bed.

13. The chair bed of claim 12 wherein said chair bed is adapted for stabilizing in a vehicle and further comprising:

(a) an engaging bar carried by said frame and a cooperating transport flange secured in the vehicle, said engaging bar adapted for removably engaging said transport flange and removably securing said chair bed to the vehicle during transportation of the chair bed; and (b) backrest stabilizing means extending from said backrest and rotatably carried by said arm rests, for stabilizing the adjustment of said backrest with respect to said arm rests.

14. The chair bed of claim 13 wherein said backrest adjusting means further comprises a pair of air cylinders each having a piston end pivotally carried by said frame and a housing end pivotally carried by said backrest, for supporting said backrest at selected angle with respect to said seat.

15. The chair bed of claim 14 wherein said backrest stabilizing means further comprises two lengths of square tubing carried by said arm rests in spaced relationship, respectively; a longitudinal slot provided in each of said lengths of square tubing and a pin roller disposed in rotatable relationship in each of said lengths of square tubing; an arm rest pin projecting through said longitudinal slot in each of said lengths of square tubing, with one end of said arm rest pin fixedly carried by said backrest and the opposite end of said arm rest pin rotatably attached to said pin roller, whereby said pin roller is caused to traverse said square tubing and said arm rest pin traverses said longitudinal slot in each of said lengths of square tubing, respectively, responsive to adjustment of said backrest with respect to said arm rests.

16. In a chair bed for carrying non-ambulatory persons and adapted for removably latching to a receiver mechanism mounted in close proximity to a commode, the improvement in combination therewith comprising:

(a) a box-like frame;

(b) a pair of main wheels journalled for rotation in said frame and a pair of front wheels rotatably and pivotally carried by said frame in spaced relationship with respect to said main wheels;

(c) a seat fixedly attached to said frame and a curved recess provided in said seat for selectively accommodating the curvature of the commode;

(d) a backrest hingedly carried by said seat, said backrest adapted to pivot from essentially a 90 degree angle with respect to said seat, to essentially a 180 degree with respect to said seat;

(e) backrest adjusting means adjustably carried by said frame and said backrest for selectively adjusting the angle of repose of said backrest with respect to said seat;

(f) a pair of arm rests pivotally carried by said frame in spaced, substantially parallel relationship for supporting the arms of an occupant;

(g) a pair of foot support bars pivotally carried by said frame and pivotally connected to one end of said arm rests, respectively, and a pair of rear pivoting members pivotally carried by said frame and the opposite ends of said arm rests, respectively, said rear pivoting members adapted for selectively raising and lowering said arm rests and said foot support bar with respect to said frame; and (h) latch means carried by said frame and adapted to removably engage said receiver mechanism for locating the curvature of the commode in said curved recess and securing said chair bed in said close proximity to the commode.

17. The chair bed of claim 16 wherein said chair bed is adapted for stabilizing in a vehicle and further comprising:

(a) an engaging bar carried by said frame and a cooperating transport flange secured in the vehicle, said engaging bar adapted for removably engaging said transport flange and removably securing said chair bed to the vehicle during transportation of the chair bed; and (b) backrest stabilizing means carried by said backrest and rotatably engaging said arm rests, for smooth adjustment of said backrest with respect to said arm rests.

18. The chair bed of claim 17 wherein said backrest adjusting means further comprises a pair of air cylinders, each having a piston end pivotally carried by said frame and a housing end carried by said backrest, for supporting said backrest at a selected angle with respect to said seat.

19. The chair bed of claim 18 wherein said backrest stabilizing means further comprises two lengths of square tubing carried by said arm rests in spaced relationship, respectively; a longitudinal slot provided in each of said lengths of square tubing and a pin roller disposed in rotatable relationship in each of said lengths of square tubing; an arm rest pin projecting through said longitudinal slot in each of said lengths of square tubing, with one end of said arm rest pin fixedly carried by said backrest and the opposite end of said arm rest pin rotatably attached to said pin roller, whereby said pin roller is caused to traverse said square tubing and said arm rest pin traverses said longitudinal slot in each of said lengths of square tubing, respectively, responsive to adjustment of said backrest with respect to said arm rests.

20. The chair bed of claim 19 wherein said main wheels are removed from said frame and further comprising a pair of rear wheels rotatably and pivotally carried by said frame in spaced relationship with respect to said main wheels and said front wheels for enhancing the directional control of said chair bed.

21. In a chair bed for carrying non-ambulatory persons and adapted for stabilizing in a vehicle and removably latching to a receiver mechanism mounted in close proximity to a commode, the improvement comprising:

(a) a box-like frame;

(b) an engaging bar carried by said frame and a cooperating transport flange secured in the vehicle, said engaging bar adapted for removably engaging said transport flange and removably securing said chair bed to the vehicle during transportation of the chair bed;

(c) a pair of main wheels journalled for rotation in said frame and a pair of front wheels rotatably and pivotally carried by said frame in spaced relationship with respect to said main wheels;

(d) a seat fixedly attached to said frame and a curved recess provided in said seat for selectively accommodating the curvature of the commode;

(e) a backrest hingedly carried by said seat, said backrest adapted to pivot from essentially a 90° angle with respect to said seat to essentially a 180° angle with respect to said seat;

(f) backrest adjusting means adjustably carried by said frame and said backrest for selectively adjusting the angle of repose of said backrest with respect to said seat;

(g) a pair of arm rests pivotally carried by said frame in spaced, substantially parallel relationship for supporting the arms of an occupant; two lengths of square tubing carried by said arm rests in spaced relationship, respectively; a longitudinal slot provided in each of said lengths of square tubing and a pin roller disposed in rotatable relationship in each of said lengths of said square tubing; and an arm rest pin projecting through said longitudinal slot in each of said lengths of square tubing, with one end of said arm rest pin fixedly carried by said backrest and the opposite end of said arm rest pin rotatably attached to said pin roller, whereby said pin roller is caused to traverse said square tubing and said arm rest pin traverses said longitudinal slot in each of said lengths of square tubing, respectively, responsive to adjustment of said backrest with respect to said arm rest; and (h) latch means carried by said frame and adapted to removably engage said receiver mechanism for locating the curvature of the commode in said curved recess and securing said chair bed in said close proximity to the commode.

22. The chair bed of claim 21 wherein said backrest adjusting means further comprises a pair of air cylinders, each having a piston end pivotally carried by said frame and a housing end carried by said backrest, for supporting said backrest at a selected angle with respect to said seat.

23. The chair bed of claim 22 wherein said main wheels are removed from said frame and further comprising a pair of rear wheels rotatably and pivotally carried by said frame in spaced relationship with respect to said main wheels and said front wheels for enhancing the directional control of said chair bed.

* * * * *